(12) United States Patent
Hoffmann et al.

(10) Patent No.: US 9,171,247 B1
(45) Date of Patent: Oct. 27, 2015

(54) SYSTEM AND METHOD FOR FAST TEMPLATE MATCHING IN 3D

(71) Applicant: HRL Laboratories, LLC, Malibu, CA (US)

(72) Inventors: Heiko Hoffmann, Simi Valley, CA (US); Hooman Kazemi, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 276 days.

(21) Appl. No.: 13/747,987

(22) Filed: Jan. 23, 2013

Related U.S. Application Data

(63) Continuation-in-part of application No. 13/358,095, filed on Jan. 25, 2012, now Pat. No. 8,818,923.

(60) Provisional application No. 61/501,636, filed on Jun. 27, 2011, provisional application No. 61/589,686, filed on Jan. 23, 2012.

(51) Int. Cl.
*G06N 3/02* (2006.01)
*G06K 9/62* (2006.01)
*G06K 9/00* (2006.01)

(52) U.S. Cl.
CPC .............. *G06N 3/02* (2013.01); *G06K 9/00201* (2013.01); *G06K 9/62* (2013.01); *G06K 9/6202* (2013.01)

(58) Field of Classification Search
CPC ........................................... G06K 9/62–9/726
USPC ..................... 382/155–161, 181–231; 706/20
See application file for complete search history.

(56) References Cited

U.S. PATENT DOCUMENTS

| 6,236,749 | B1* | 5/2001 | Satonaka et al. ............... 382/154 |
| 7,085,418 | B2 | 8/2006 | Kaneko et al. |
| 7,340,089 | B2* | 3/2008 | Nair et al. ...................... 382/159 |
| 7,599,894 | B2 | 10/2009 | Owechko et al. |
| 7,787,474 | B2 | 8/2010 | Van Lunteren |
| 8,068,431 | B2 | 11/2011 | Varadarajan et al. |
| 2011/0216948 | A1* | 9/2011 | Yalla et al. ...................... 382/125 |

OTHER PUBLICATIONS

R.S. Boyer, et al., "A fast string searching algorithm," Communications of the ACM, 20; 762-772, 1977.

M. Zubair, et al., "Text scanning approach for exact string matching," International Conference on Networking and Information Technology, 2010.

(Continued)

*Primary Examiner* — Stanley K Hill
(74) *Attorney, Agent, or Firm* — Tope-McKay & Associates

(57) ABSTRACT

Described is a pattern matching system for matching a test image with a 3D template. The system is initiated by generating a library of templates (each individual template is a three-dimensional array, with each pixel in the array representing a value at a particular x, y, and z coordinate). Each column of pixels along one axis (e.g., z) is converted into a neural input. Each neural input is fed through a neural network to establish a delayed connection between each neural input and output neuron and to generate a template neural network. Separately, a test image is converted into neural inputs. The neural inputs of the test image are input the template neural network to generate output neurons. The output neurons are evaluated to identify a location of the template in the test image.

24 Claims, 6 Drawing Sheets

(56) References Cited

OTHER PUBLICATIONS

M. Sipser, "Introduction to the Theory of Computation," PWS, Boston, ISBN 0-534-94726-X, Section 1.1; Finite Automata, pp. 31-47, 1997.
W. Maass, et al., "Real-time computing without stable states; a new framework for neural computation based on perturbations," Neural Computation 14(11); 2531-2560, 2002.
A.V. Aho, et al., "Efficient string matching: An aid to bibliographic search," Communications of the ACM, 18(6): 333-340, 1975.
A. Waibel, et al., "Phoneme Recognition Using Time-Delay Neural Networks," IEEE Transactions on Acoustics, Speech, and Signal Processing, 37(3): 328-339, 1989.
J.L. Elman, "Finding structure in time," Cognitive Science, 14(2): 179-211, 1990.
E.M. Izhikevich, "Polychroniation: Computation with spikes," Neural Computation, 18(2): 245-282, 2006.
H. Pugam-Moisy, et al., "Delay learning and polychronization for reservoir computing," Neurocomputing, 71 (7-9): 1143-1158, 2008.
W. Maier, et al., "A Minimal Model for the Study of Polychronous Groups," arXiv:0806. 1070v1 [Condensed Matter, Disordered Systems and Neural Networks], 2008.
Erik Hjelmvik & Wolfgang John, "Statistical Protocol IDentification with SPID: Praliminary Results", SNCNW'09: 6th Swedish National Computer Networking Workshop, Uppsala, Sweden, May 4, 2009 <http://spid.sourceforge.net/sncnw09-hjelmvik_john-CR.pdf>.
Martin Roesch: Snort: Lightweight Intrusion Detection for Networks. LISA 1999 <http://dblp.dagstuhl.de/db/conf/lisa/lisa1999.html#Roesch99> : 229-238.
"Technical Details of 17-filter" 2006, website http://17-filter.sourceforge.net/technicaldetails.
Khalife, J., Hajjar, A., & Diaz-Vardejo, J. (Nov. 2011). On the Performance of OpenDPI in Identifying P2P Truncated Flows. In AP2PS 2011, The Third International Conference on Advances in P2P Systems (pp. 79-84).
N. Cascarano, A Este, F. Gringoli, F. Risso, and L. Salgarelli, "An Experimental Evaluation of the Computational Cost of a DPI Traffic Classifier", Proc. GLOBECOM'09, 2009, pp. 1-8 is related prior art.
Sipser, Introduction to the Theory of Computation, PWS, Boston. ISBN 0-534-94728-X. Section 1.1: Finite Automata, pp. 31-47, 1997.
A V Aho, M J Corasick, Efficient string matching: An aid to bibliographic search. Communications of the ACM, 18(6): 333-340, 1975.
eBayes TCP [Adaptive, Model-based Monitoring for Cyber Attack Detection, Keith Skinner & Alfonso Valdes, Lecture Notes in Computer Science, No. 1907, From Recent Advances in Intrusion Detection (RAID 2000), Edited by H. Debar and L. Me and F. Wu. Springer-Verlag. Toulouse, France, Oct. 2000, pp. 80-92.].
K. Koscher, A. Czeskis, F. Roesner, S. Patel, T. Kohno, S. Checkoway, D. McCoy, B. Kantor, D. Anderson, H. Shacham, S. Savage. Experimental Security Analysis of a Modern Automobile. The IEEE Symposium on Security and Privacy, Oakland, CA, May 16-19, 2010.
Michael Sipser, Introduction to the Theory of Computation, PWS, Boston. 1997. ISBN 0-534-94728-X. Section 1.1: Finite Automata, pp. 31-47.
Alfred V. Aho and Margaret J. Corasick. Efficient string matching: an aid to bibliographic search. Commun. ACM, 18:333-340, Jun. 1975.
Marina Blanton and Mehrdad Aliasgari. Secure outsourcing of dna searching via finite automate. In 24th annual IFIP WG 11.3 working conference on Data and applications security and privacy (DBSec'10), pp. 49-64, 2010.
Taher El Gamal. A public key cryptosystem and a signature scheme based on discrete logarithms. In proceedings of CRYPTO 84 on Advances in cryptology, pp. 10-18, New York, NY, USA, 1985. Springer-Verlag New York, Inc.
Ronald Cramer, Rosario Gennaro, and Berry Schoenmakers. A secure and optimally efficient multi-authority election scheme, pp. 103-118. Springer-Verlag, 1997.

Ivan Damgård. Efficient concurrent zero-knowledge in the auxiliary string model. In Proceedings of the 19th international conference on Theory and application of cryptographic techniques, EUROCRYPT'00, pp. 418-430, Berlin, Heidelberg, 2000, Springler-Verlag.
Ivan Damgård and Mats Junk. A generalisation, a simplification and some applications of paillier's probabilistic public-key system. In Proceedings of the 4th International Workshop on Practice and Theory in Public Key Cryptography: Public Key Cryptography, PKC'01, pp. 119-136, London, UK, 2001. Springer-Verlag.
Ivan Damgård and Claudio Orlandi. Multiparty computation for dishonest majority: from passive to active security at low cost. In Proceedings of the 30th annual conference on Advances in cryptology, CRYPTO'10, pp. 558-576, Berlin, Heidelberg, 2010. Springer-Verlag.
Jens Groth and Yuval Ishai. Sub-linear zero-knowledge argument for correctness of a shuffle, In Nigel Smart, editor, Advances in Cryptology—EUROCRYPT 2008, vol. 4965 of Lecture Notes in Computer Science, pp. 379-396. Springer Berlin / Heidelberg, 2008.
O. Goldreich, S. Micalli, and A. Wigderson. How to play any mental game. In Proceedings of the nineteenth annual ACM symposium on Theory of computing, STOC '87, pp. 218-229, New York, NY, USA, 1987, ACM.
Juan A. Garay, Philip MacKenzie, and Ke Yang. Strenthening zero-knowledge protocols using signatures, In Proceedings of the 22nd international conference on Theory and applications of cryptographic techniques, EUROCRYPT'03, pp. 177-194, Berlin, Heidelberg. 2003, Springer-Verlag.
Carmit Hazay, Rosario Gennaro, and Jeffery Sorensen. Automate evaluation and text search protocols with simulation based security. In Public Key Cryptography, pp. 145-160, 2010.
Heiko Hoffman, Michael Howard, and Michael Daily. Fast pattern matching with time-delayed neural networks. In International Joint Conference on Neural Networks (to appear), 2011.
Carmit Hazay and Yehuda Lindell. Efficient protocols for set intersection and pattern matching with security against malicious and covert adversaries. In Proceedings of the 5th conference on Theory of cryptography, TCC'08, pp. 155-175, Berlin. Heidelberg, 2008, Springer-Verlag.
Carmit Hazay and Tomas Toft. Computationally secure pattern matching in the presence of malicious adversaries. In ASIACRYPT, pp. 195-212, 2010.
Yuval Ishai, Manoj Prabhakaran, and Amit Sahai. Founding cryptography on oblivious transfer—efficiently. In Proceedings of the 28th Annual conference on Cryptology: Advances in Cryptology, CRYPTO 2008, pp. 572-591, Berlin, Heidelberg, 2008, Springer-Verlag.
Jonathan Katz and Lior Malka, Secure text processing with applications to private dna matching. In Proceedings of the 17th ACM conference on Computer and communications security, CCS'10, pp. 485-492, New York, NY, USA 2010. ACM.
Knuth, Donald; Morris, James H., jr; Pratt, Vaughan (1977). "Fast pattern matching in strings". SIAM Journal on Computing 6(2): 323-350.
Richard M. Karp and Michael O. Rabin. Efficient randomized pattern-matching algorithms. IBM J. Res. Dev., 31:249-260, Mar. 1987.
K. Namjoshi and G. Nartikar. Robust and fast pattern matching for intrusion detection. In INFOCOM, 2010 Proceedings IEEE, pp. 1-9, Mar. 2010.
Pascal Paillier. Public-key cryptosystems based on composite degree residuosity classes, In Proceedings of the 17th international conference on Theory and application of cryptographic techniques, EUROCRYPT'99, pp. 223-238, 1999.
Torben P. Pedersen. Non-interactive and information-theoretic secure verifiable secret sharing. In Proceedings of the 11th Annual International Cryptology Conference on Advances in Cryptology, CRYPTO'91, pp. 129-140, London, UK, 1992. Springer-Verlag.
Sructural joins: A primitive for efficient xml query pattern matching. In Proceedings of the 18th International Conference on Data Engineering, ICDE '02, pp. 141-, Washinton, DC, USA, 2002. IEEE Computer Society.
Claus-Peter Schnorr. Efficient identification and signatures for smart cards. In Proceedings of the 9th Annual International Cryptology

(56) References Cited

OTHER PUBLICATIONS

Conference on Advances in Cryptology, CRYPTO'89, pp. 239-252, London, UK, UK, 1990. Springer-Verlag.

Juan Ramón Troncoso-Pastoriza, Stefan Katzenbeisser, and Mehmet Celik. Privacy preserving error resilient dna searching through oblivious automata. In Proceedings fo the 14th ACM conference on Computer and communications security, CCS'07, pp. 519-528, New York, NY, USA, 2007, ACM.

Tsung-Hsi Tsai. Average case analysis of the boyer-moore algorithm. Random Struct. Algorithms, 28:481-498, Jul. 2006.

Andrew C. Yao, Protocols for secure computations. In Proceedings of the 23rd Annual Symposium on Foundations of Computer Science, SFCS '82, pp. 160-164, Washington, DC, USA, IEEE Computer Society.

Andrew Chi-Chih Yao. How to generate and exchange secrets. In Proceedings of the 27th Annual Symposium on Foundations of Computer Science, pp. 162-167, Washinton, DC, USA, 1986. IEEE Computer Society.

Joshua Baron, Karim El Defrawy, Kirill Minkovich, Rafail Ostrovsky, and Eric Tressler. 5PM: Secure Pattern Matching. Security and Cryptography for Networks. Lecture Notes in Computer Science, vol. 7485, pp. 222-240, 2012.

L. Di Stefano, S. Mattoccia, "A sufficient condition based on the Cauchy-Schwarz inequality for efficient Template Matching", IEEE Int. Conf. on Image Processing (ICIP 2003), Sep. 14-17, 2003, Barcelona, Spain.

L. G. Brown, "A survey of image registration to techniques," ACM Comput. Surv., vol. 4, No. 4, pp. 325-376, 1992.

J. J. Hopfield, Neural networks and physical systems with emergent collective computational abilities, Proceedings of the National Academy of Sciences of the USA, vol. 79 No. 8 pp. 2554-2558, Apr. 1982.

P. Wang, A DeNunzio, P Okunieff, WG O'Dell. Lung metastases detection in CT images using 3D template matching. Med. Phys. 34 (3), pp. 915, Mar. 2007.

Luigi di Stafano, Stefano Mattoccia, Federico Tombari, "An Algorithm for Efficient and Exhaustive Template Matching." Jan. 2004; In proceeding of Image Analysis and Recognition: International Conference, ICIAR 2004, Porto, Portugal, Sep. 29-Oct. 1, 2004, Proceedings, Part II.

* cited by examiner

SYSTEM AND METHOD FOR FAST TEMPLATE MATCHING IN 3D

CROSS-REFERENCE TO RELATED APPLICATIONS

This is a Continuation-in-Part application of U.S. patent application Ser. No. 13/358,095, filed on Jan. 25, 2012, and entitled. "Neural Network Device with. Engineered Delays for Pattern Storage and Matching," which is a Non-Provisional Application of U.S. Provisional Application No. 61/501,636, filed on Jun. 27, 2011 and entitled, "Neural Network Device with. Engineered Delays for Pattern Storage and Matching."

This is ALSO a Non-Provisional Application of U.S. Provisional Application No. 61/589,686, filed on Jan. 23, 2012, and entitled, "Process and Method for Fast Template Matching in 3D Images."

FIELD OF INVENTION

The present invention relates to a pattern matching system and, more particularly, to a system for finding a matching 3D template in a stack of images.

BACKGROUND OF INVENTION

Pattern matching is a technique by which a test image is matched to a template or stored image. This process is typically referred to as template matching. Normalized cross-correlation (NCC) is the standard for template matching in images. Until recently, correlations have been used in novel template-matching devices, such as those described by TI Kaneko and O Hori in U.S. Pat. No. 7,085,418, titled, "Template matching method and image processing device." NCC can find exact matches; however, its disadvantage is the computational complexity. In other words, NCC scales as the volume of the image times the volume of the template. Thus, for high-density integrated circuits (ICs), the search time can be prohibitive (e.g., greater than 1000 hours). Despite this limitation, NCC has been hardly improved upon: typical speed-ups are slightly (about 2×), as was described by L. Di Stefano and S. Mattoccia, in "A sufficient condition based on the Cauchy-Schwarz inequality for efficient Template Matching", IEEE Int. Conf on Image Processing (ICIP 2003), Sep. 14-17, 2003.

To speed up cross-correlation, Fourier transformations (FT) have been used (see L. G. Brown, "A survey of image registration techniques," ACM Comput Surv., vol. 24, no. 4, pp. 325-376, 1992). FT can greatly reduce the time to compute the correlation between test image and template. However, computing the FT on the test image requires $N \log_2(N)$ operations, where N is the number of pixels. Thus, for large images, which are typical for ICs, this computation alone can be more expensive than the total computation required for our invention.

Another group of methods, iterative search methods (e.g., swarm vision as described by Owechko et al. in U.S. Pat. No. 7,599,894), do not search exhaustively in the test image; instead, they iteratively move the template location within the test image until a high correlation is achieved. These methods perform well if the test image is sufficiently blurry such that a gradient exists that points in the direction of higher correlation. However, for exact matching, as in circuit leaf-cell search, such methods are not optimal.

The present invention is also related to pattern recall in recurrent neural networks (RNN), such as those described by J. J. Hopfield in "Neural networks and physical systems with emergent collective computational abilities", Proceedings of the National Academy of Sciences of the USA, vol. 79 no. 8 pp. 2554-2558, April 1982, which is incorporated herein by reference. As in the present invention, the neural networks first store template patterns. Different from the present invention, however, these patterns are stored by adjusting weights of neural connections instead of delays. In pattern recall from RNNs, a pattern is first fed into the input neurons, and then, the network's dynamics converge to a related stored pattern. This process is also called pattern association. A disadvantage of this process is the low speed. Computing the network dynamics is an iterative process. Moreover, such networks alone do not provide an efficient mechanism to feed the whole test image into the network. Therefore, as in cross-correlation, every test image location would need to be compared with the template image. As result, using RNNs for pattern matching would be slower than using normalized cross-correlation.

As evident above, the state of the art in image template matching is normalized cross-correlation, which has not been significantly improved upon for several decades. Thus, continuing need exits for a pattern matching system with a substantial speed improvement over existing and traditional systems.

SUMMARY OF INVENTION

The present invention is directed to a system for pattern matching by finding a matching 3D template in a stack of images. The system comprises one or more processors and a memory, with the memory having instructions encoded thereon for causing the one or more processors to perform a variety of operations as listed herein. Such operations include converting a test array into neural inputs; receiving the neural inputs into a template neural network to generate output neurons; and evaluating the output neurons to identify a location of a template in the test array. In receiving the neural inputs into a template neural network to generate output neurons, the neural input is fed forward to the output neurons through delayed connections. Further, as an example, the test array can be a test image.

In another aspect, the system performs additional operations of generating a library of templates, where each template is a three-dimensional array, with each pixel in the array representing a value at a particular x, y, and z coordinate along x, y, and z axes. Thus, the library of templates is composed of a plurality of three-dimensional templates. Each column of pixels along one axis is converted into a neural input. Further, a delayed connection is established between each neural input and output neurons to generate the template neural network.

In yet another aspect, establishing a delayed connection further comprises operations of converting each pixel of each three-dimensional array through all layers into a neural index; converting an x-axis into a time axis such that pixels with different x-coordinates represent different events in time; identifying an x-location of a pixel or set of pixels in the template with the largest x-value (the x-location with the largest x-value is a reference point that corresponds to a latest time point when pixels of the template are entered into the template neural network); and setting a connection delay between each input neuron and output neuron based on a time gap between the x-location of each input neuron and the reference point.

In another aspect, evaluating the output neurons further comprises operations of comparing values of the output neurons against a threshold, such that if an output neuron reaches its threshold, the output neuron fires, indicating a match between the template and test array; obtaining an x-axis location as a time-step in which the output neuron fired; and obtaining a y-axis location from an index of the output neuron.

Finally, the present invention also includes a method and computer program product. The computer program product includes instructions encoded on a non-transitory computer-readable medium for causing a processor to perform the operations listed herein, while the method comprises an act of causing a processor to execute instructions on a memory to perform the listed operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
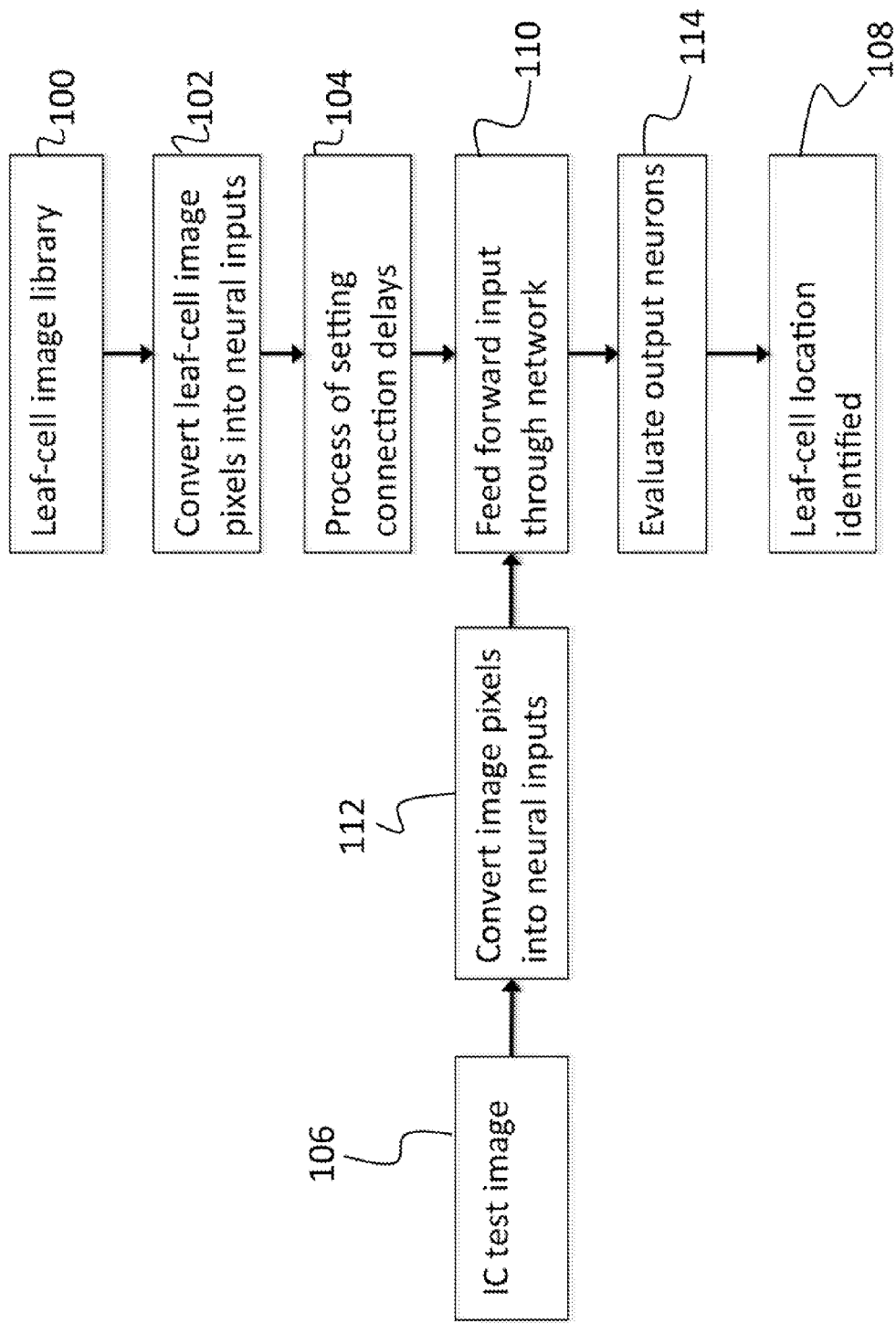
FIG. 1 is a flowchart showing a process of leaf-cell localization within a test image of an integrated circuit.

The present invention relates to a pattern matching system and, more particularly, to a system for finding a matching 3D template in a stack of images. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are show-n in block diagram form, rather than in detail, in order to avoid obscuring the present invention.

The reader's attention is directed to all papers and documents which are filed concurrently with this specification and which are open to public inspection with this specification, and the contents of all. such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features, Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a description of the various principal aspects of the present invention is provided. Subsequently, an introduction provides the reader with a general understanding of the present invention, Finally, specific details of the present invention are provided to give an understanding of the specific aspects.

(1) Principal Aspects

The present invention has three "principal" aspects. The first is a pattern matching system. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

(2) Introduction

The present invention provides a method for a quick search of 3D image templates in stacks of images, Image template matching analyzes two images to find the location of a template image within a test image, where the test image is larger than the template. A unique aspect of the invention is that it processes a whole stack of images, column-by-column, and feeds one column at a time into a neural network (such as the neural network described by U.S. patent application Ser. No. 13/358,095, filed on Jan. 25, 2012, and entitled, "Neural Network Device with Engineered Delays for Pattern Storage and Matching," which is incorporated by reference as though fully set forth herein).

The neural network allows for setting of connection delays to store patterns. At each time interval, an input-neuron column is mapped into the neural network creating delays towards an output neuron. As the input columns are fed into the network, the output neuron is constantly updated. The value of the output neuron is monitored and compared against a threshold. Once the threshold value has been reached, a positive recognition is achieved and the process continues. This single path through the network substantially increases the matching speed. The neural network described in U.S. patent application Ser. No. 13/358,095 is adapted in the present invention to allow for 3D template matching. A further novel component involves the encoding of the pixels through all stacks at each image location. Each stack of pixels is encoded into a single value that corresponds to an input neuron of the neural network. This encoding results in sparse connections, which improves speed.

As such, a result of the present invention is that it improves the speed for 3D pattern matching in digital data. The invention focuses on exact pattern matching and localization, which is distinct from approximate localization through iterative methods. Compared to the state of the art in exact pattern matching, an advantage of the invention is a substantial improvement in computation speed. For 3D patterns, the improvement can be two orders of magnitude. Thus, this invention is particularly suited for searching circuit "leaf-cells", root-cells and functions in large integrated circuit (IC) layouts. It should be noted that the term leaf-cell as used herein generally refers to the smallest base cell or component of a structure. The matching process is ideally suited to complex ICs with uniform and repeatable layout patterns. Identifying leaf cells in IC data is a necessary component for reverse-engineering circuits and for malicious circuit detection. These leaf cells are standardized and thus suitable for exact matching. Moreover, IC layouts are stacks of 2D images to which the invention particularly applies. Specific details regarding the present invention are provided below.

(3) Specific Details of the Invention

As noted above, a purpose of this invention is to find a 3D template in a stack of 2D images. While any suitable images can be used, a non-limiting example of a stack of images includes layers of circuits in a chip. The invention employs a neural network to store templates and later recall them during matching with a test image. In matching, a test image is sliced into columns through all layers, and one column at a time is fed into the network. Thus, the image is converted in a time sequence of slices: the x-axis becomes the time axis. The network includes sets of input neurons and output neurons. The input neurons can hold the content of a whole column, of the test image. These input neurons feed into the output neurons through neural connections. When storing templates, connections are formed between input and output neurons. In recall, an activated output neuron indicates the template found and its location within the test image.

For further understanding, FIG. 1 is a flow chart depicting the method of the present invention as applied to identifying and locating circuit leaf-cells within an IC chip. It should be understood that ICs are used for illustrative purposes only as the present invention is not intended to be limited to ICs. For example, instead of ICs, other 3D data structures may be used. The main steps as depicted in FIG. I are detailed below.

(3.1) Image Library

Before applying the network for template matching, an image library 100 of templates (e.g., a library of leaf cells) is created using any suitable technique. The library is essentially a plurality of three-dimensional templates. For example, the leaf-cell images may be extracted from X-ray TIF images, and a 3D binary image data file is then generated with the height information. It should be understood that the template library is not limited to representations of images. For example any two or three-dimensional array can be used where each entry in the array represents some value at a particular x, y, and z coordinate. As a non-limiting example, the values stored for each x, y coordinate may represent the doping concentration at that location, the doping type, the composition of semiconductor at the x, y, and z location or a logical value. The logical value may represent that the x, y, and/or z location is part of a contact or not.

Moreover, the template matching method described herein allows any D (e.g. 2D, 3D, 4D etc.) level template to be converted into a neural network, then tested for a match to a test array by inputting each D level column of the test array into the template neural network. The final output of the template neural network is a measure of the match between the template and test array. An array or test array is any structure that can be reduced to a multi-dimensional grid or lattice of numbers. A non-limiting example of such an array or test array is a 2D image As noted above, the term leaf-cell as used herein generally refers to the smallest base cell or component of a structure. These base cells (or leaf-cells) are used for further design/layout to create larger blocks (e.g., the integrated circuit). As a non-limiting example, a leaf cell is a configuration of multiple logical elements (e.g., AND and OR gates) and this configuration is fixed, pre-designed, to make the design of the whole chip easier.

(3.2) Conversion of Pixels into Neural Input

In the next step, each template/cell image is converted 102 into neural input. The 3D template is composed of several 2D layers of binary images (e.g., the metal layers available on the IC). For each position on a layer, a pixel array is extracted that stretches through all layers.

Figure 2:
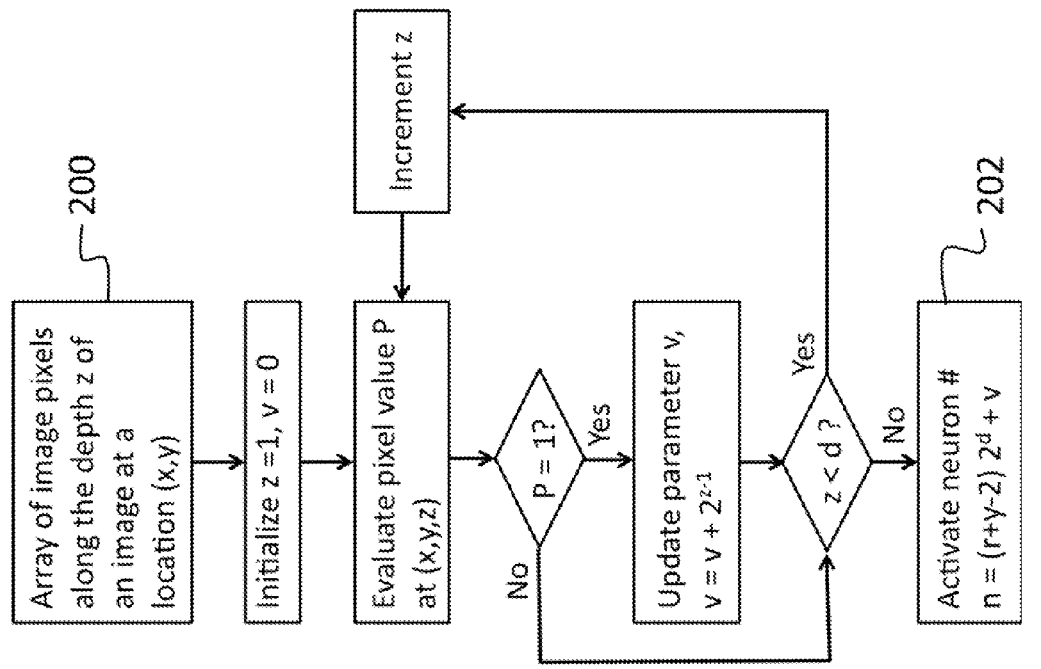
FIG. 2 is a flowchart showing a process for converting an array of pixels along the depth of an image into an activation of a single neuron.

FIG. 2 is a flow chart illustrating the process of converting 102 an array of pixels 200 into neural input 202. Specifically, FIG. 2 illustrates a process for converting an array of pixels 200 along the depth of an image into an activation of a single neuron 202. Each binary pixel combination for an array is mapped onto a signal neuron, whose index is computed according to FIG. 2. Thus $2^d$ neurons are required to encode all possible combinations for an array, where d is the number of layers. In other words, the image consists of d layers. For storing a template, r is the location of the template within the test image. If converting pixels from the test image, r=0 and y is the location within the test image.

Optionally, a neural index of 0 implies that no input neuron is activated. Thus, the corresponding location on the template functions as a wildcard, i.e., the network ignores the pixel values at the corresponding location within the test image.

In recall (i.e., pattern matching), the pixels within the test image are converted into a neural input using the same process as is performed for a template. Thus, the process depicted in FIG. 2 applies to both template and test images. Note, in recall, the process in FIG. 2 is not used for the template anymore; for the template, the process is used only during storage.

(3.3) Process of Setting Connection Delays

Figure 3:
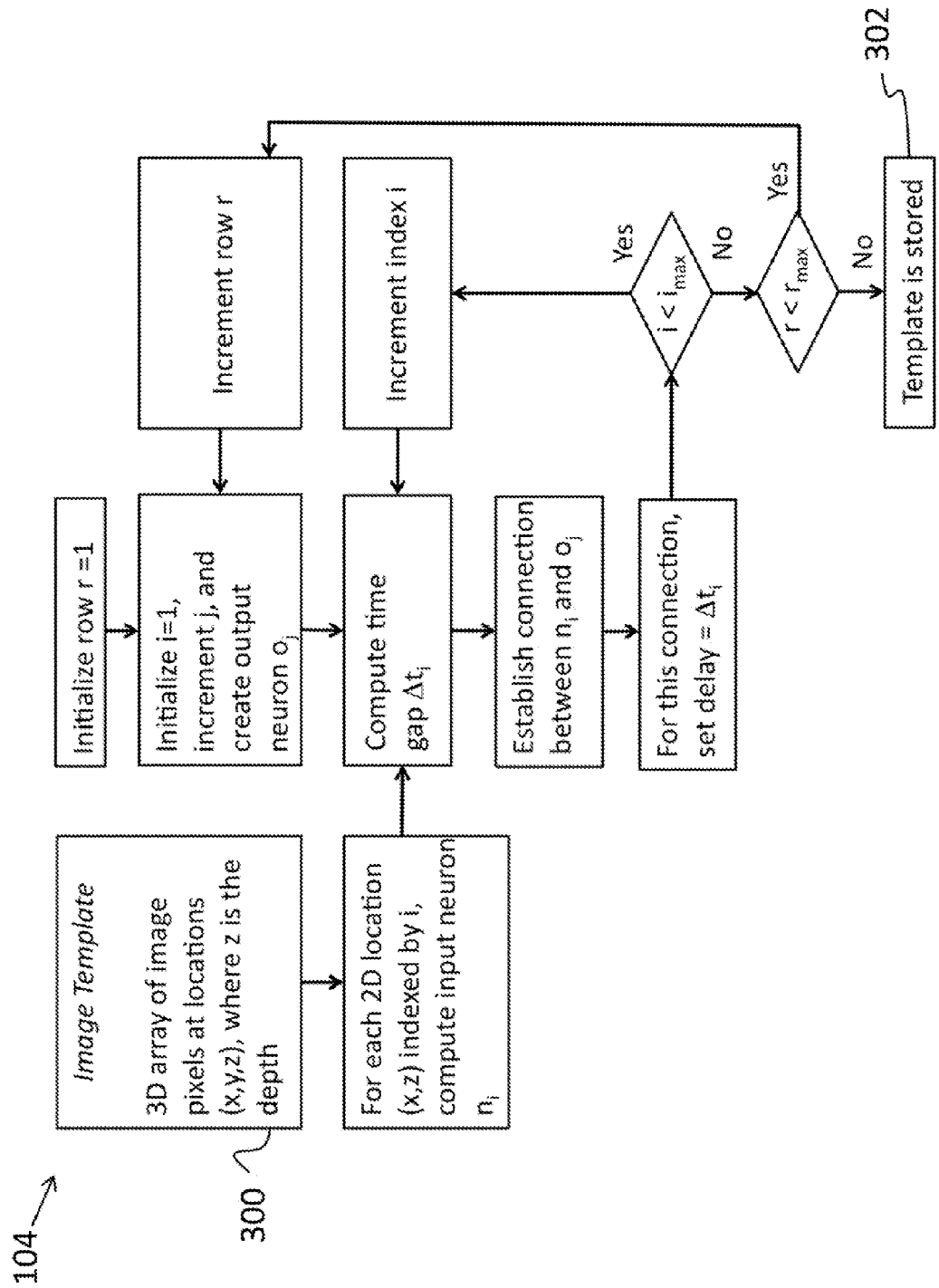
FIG. 3 is a flowchart showing a process for storing a new image template.

Referring again to FIG. 1, after the pixels are converted 102 into neural inputs, a process of setting connection delays 104 is performed. To store a template, connections between input and output neurons are established and the delay of each connection is set. FIG. 3 is a flow chart illustrating the process of setting the connection delays 104. The image template 300 has to be stored 302 for each row of the test image, i.e., for each position along an image column, but not for each column. Therefore, FIG. 3 contains a loop over the rows r. For each image template 300 and row, an output neuron and connections to this neuron are created.

According to the process in FIG. 2, an array of pixels through all layers is converted into a neural index. This process is repeated for all (x,y) locations in the template. To compute the connection delays, the x-axis is first converted into a time axis, i.e., pixels with different x-coordinates represent different events in time. Second, a process identifies the x-location of the pixel or set of pixels in the template with the largest x-coordinate. This location corresponds to the latest time point when pixels of the template are entered into the network. This time point serves as a reference point to compute the connection delays (see also FIG. 4). Finally, the delay between input neuron and output neuron is set to the time gap between the x-location of the input neuron and the above reference point. In addition to setting delays, the threshold for each output neuron is set to number of (x,y) locations in the template (optionally, a smaller number may be chosen as described below).

(3.4) Feed Forward Input Through the Template Neural Network and Evaluation of Output Neurons Referring again to FIG. 1, after storing template images, the network can be used to locate 108 these templates in a test image 106. The test image 106 is assumed to have the same number of layers as the templates. This assumption is reasonable for IC circuits with standardized layouts. If a chip contains several device layers of active electronic components on top of each other (as in so-called 3D chips), the process can be applied to each of those device layers separately. Here, the template thickness has to match the thickness of a device layer.

Prior to initiating the feed forward process 110, the test image 106 is converted 112 into neural inputs using the same process as described above in Section 3.2. Thereafter and as depicted in FIG. 4, the feed forward process 110 is employed for template matching.

Figure 4:
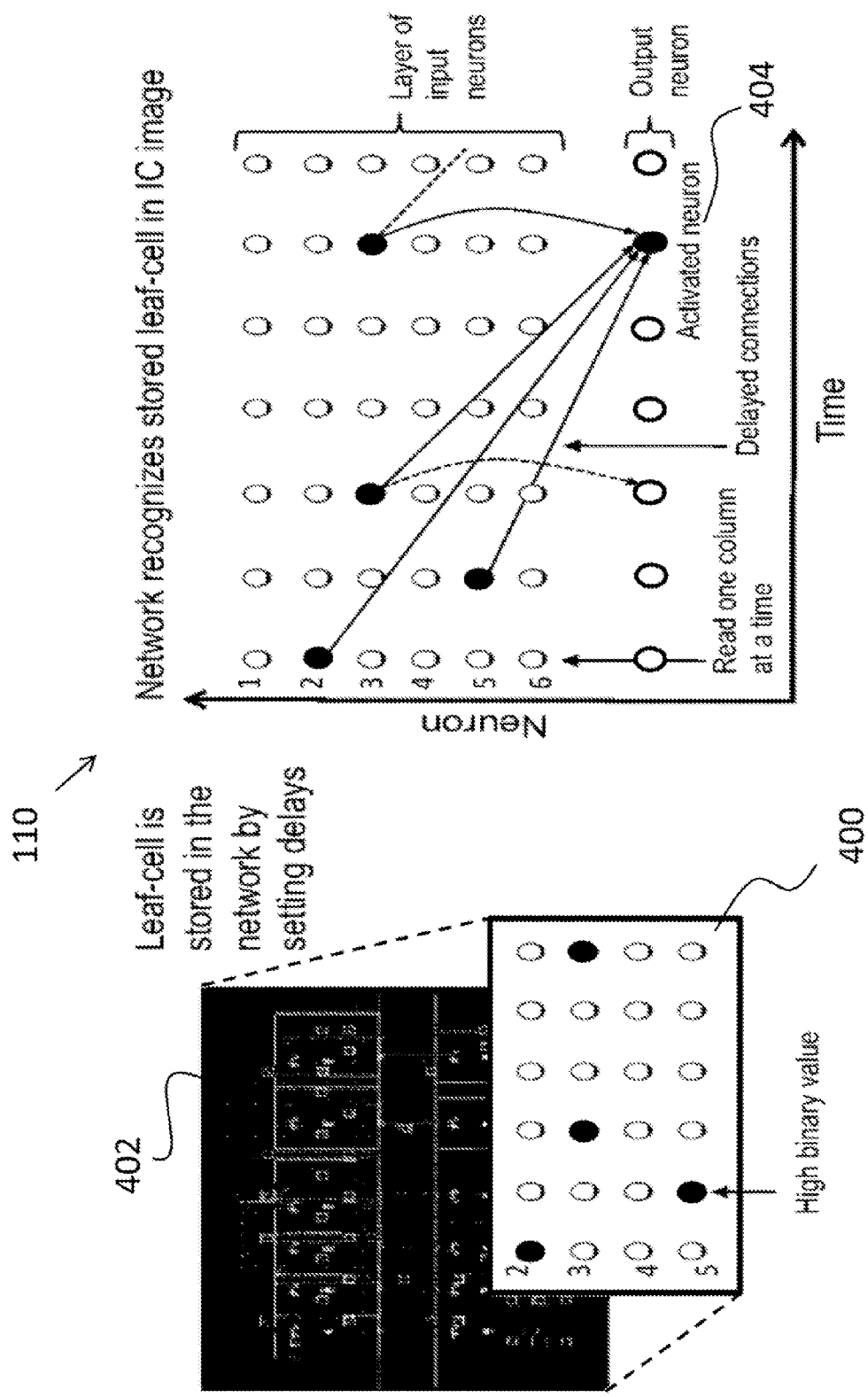
FIG. 4 is an illustration depicting a feed forward process for template matching.

Specifically, FIG. 4 depicts an example of processing a neural input through the network The binary pattern 400 of a leaf cell 402 is stored in the network (showing only one layer). When scanning an IC image, the same pattern results in an activated output neuron 404, because the feed-forward connections are delayed such that they compensate for the temporal sequence of the input In this example, the test image is sliced into columns (e.g., through the z-axis), one for each x-coordinate. Starting from x=1, the columns are feed into the input neurons of the network, one column at a time. The input neuron's activation (depicted as solid circles in FIG. 4) is fed forward, to the output neurons through delayed connections.

The next step in the process is to evaluate the output neurons (depicted as element 114 in FIG. 1). The output neurons (one for each template and template location along the y-axis) accumulate the incoming signals over time. Each incoming connection adds +1 to the value of the output neuron. At each time step, the values of the output neurons are compared against their thresholds. If an output neuron reaches its threshold, the neuron fires, indicating the observation of a complete template. Thus, the firing provides the identity of the template and its location within the test image. The x location is obtained from the time step when the firing occurred (i.e., at the corresponding location the template was observed in full), and the y location is obtained from the index of the output neuron (since each y location has its own neuron). The process of identification continues until the full test image is read into the network. Thus, all existing templates and locations can be extracted from the image in a single run.

Exact matching without false positives is achieved by setting the value of the threshold to the area of the template in the x-y plane. Optionally, a smaller value may be chosen. This choice results in the detection of partially complete templates. Such choice is of advantage if the test image is noisy and therefore an exact match with the template cannot be expected.

Figure 5:
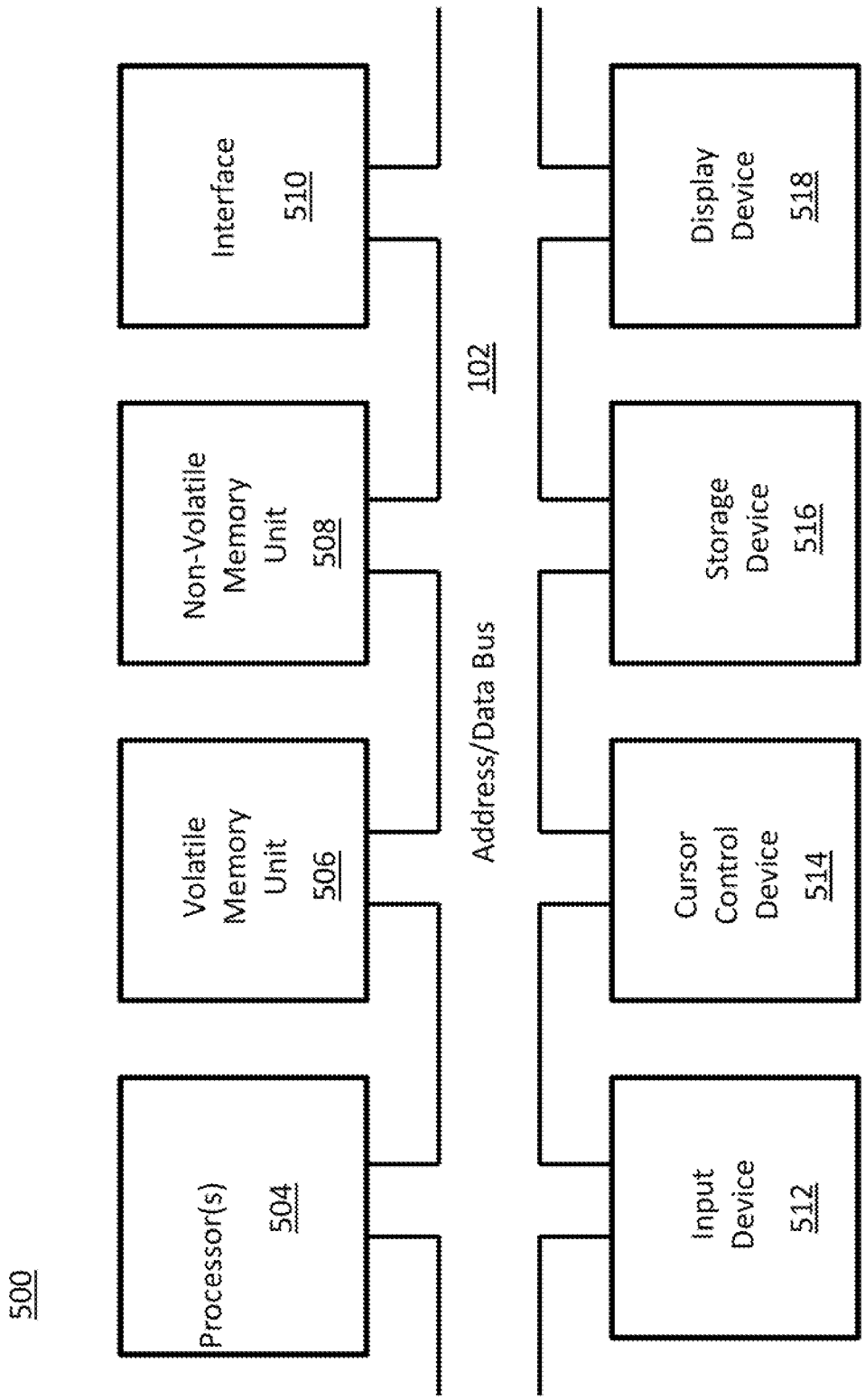
FIG. 5 is a block diagram depicting the components of a system embodying the invention.

A block diagram depicting an example of a system (i.e., computer system 500) embodying the present invention is provided in FIG. 5. The computer system 500 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 500. When executed, the instructions cause the computer system 500 to perform specific actions and exhibit specific behavior, such as described herein.

The computer system 500 may include an address/data bus 502 that is configured to communicate information. Additionally, one or more data processing units, such as a processor 504 (or processors), are coupled with the address/data bus 502. The processor 504 is configured to process information and instructions. In an aspect, the processor 504 is a microprocessor. Alternatively, the processor 504 may be a different type of processor such as a parallel processor, or a field programmable gate array, The computer system 500 is configured to utilize one or more data storage units. The computer system 500 may include a volatile memory unit 506 (e.g., random access memory ("RAM"), static RAM, dynamic RAM, etc.) coupled with the address/data bus 502, wherein a volatile memory unit 506 is configured to store information and instructions for the processor 504. The computer system 500 further may include a non-volatile memory unit 508 (e.g., read-only memory ("ROM"), programmable ROM ("PROM"), erasable programmable ROM ("EEPROM"), electrically erasable programmable ROM "EEPROM"), flash memory, etc.) coupled with the address/data bus 502, wherein the non-volatile memory unit 508 is configured to store static information and instructions for the processor 504. Alternatively, the computer system 500 may execute instructions retrieved from an online data storage unit such as in "Cloud" computing. In an aspect, the computer system 500 also may include one or more interfaces, such as an interface 510, coupled with the address/data bus 502. The one or more interfaces are configured to enable the computer system 500 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 500 may include an input device 512 coupled with the address/data bus 502, wherein the input device 512 is configured to communicate information and command selections to the processor 500. In accordance with one aspect, the input device 512 is an alphanumeric input device, such as a keyboard, that may include alphanumeric and/or function keys. Alternatively, the input device 512 may be an input device other than an alphanumeric input device. In an aspect, the computer system 500 may include a cursor control device 514 coupled with the address/data bus 502, wherein the cursor control device 514 is configured to communicate user input information and/or command selections to the processor 500. In an aspect, the cursor control device 514 is implemented using a device such as a mouse, a track-ball, a track-pad, an optical tracking device, or a touch screen. The foregoing notwithstanding, in an aspect, the cursor control device 514 is directed and/or activated via input from the input device 512, such as in response to the use of special keys and key sequence commands associated with the input device 512. In an alternative aspect, the cursor control device 514 is configured to be directed or guided by voice commands.

In an aspect, the computer system 500 further may include one or more optional computer usable data storage devices, such as a storage device 516, coupled with the address/data bus 502. The storage device 516 is configured to store information and/or computer executable instructions. In one aspect, the storage device 516 is a storage device such as a magnetic or optical disk drive (e.g., hard disk drive ("HI-DD"), floppy diskette, compact disk read only memory ("CD-ROM"), digital versatile disk ("DVD")). Pursuant to one aspect, a display device 518 is coupled with the address/data bus 502, wherein the display device 518 is configured to display video and/or graphics. In an aspect, the display device 518 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 500 presented herein is an example computing environment in accordance with an aspect. However, the non-limiting example of the computer system 500 is not strictly limited to being a computer system. For example, an aspect provides that the computer system 500 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 6:
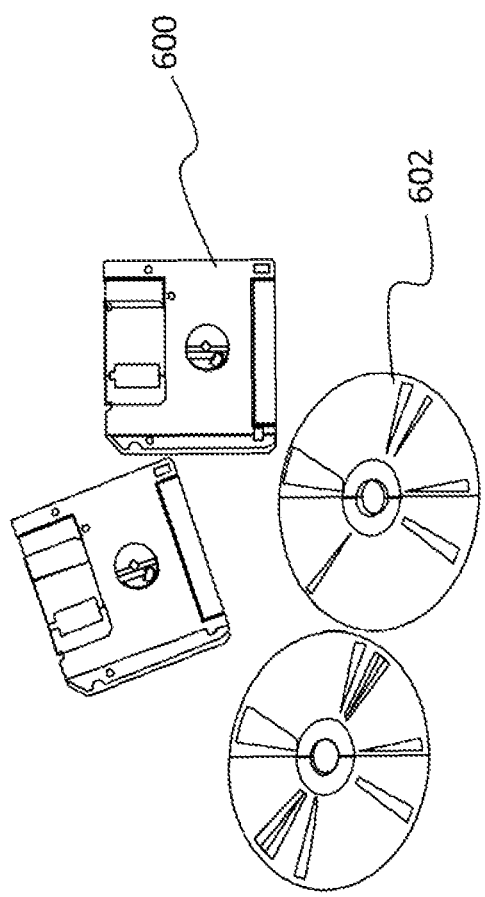
FIG. 6 is an illustration of a computer program product embodying the present invent ion.

An illustrative diagram of a computer program product (i.e., storage device) embodying the present invention is depicted in FIG. 6. The computer program product is depicted as floppy disk 600 or an optical disk 602 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" may be stored in the memory of a computer or on a computer-readable medium such as a floppy disk, a CD-ROM, and a flash drive. In either event, the instructions are encoded on a non-transitory computer-readable medium, The computational complexity of the matching process with the present invention outperforms the complexity of computing cross-correlation. In the present invention, this complexity scales with the area (in x-y plane) of the test image times the average number of connections for each input neuron. The encoding of the pixels along the depth of the image into a single neuron blows up the number of input neurons and results in a very sparse connectivity. This sparsity greatly reduces the average number of connection and therefore improves the overall speed. In contrast, the computational complexity of NCC for each template scales with the volume of the test image times the volume of the template. Thus, particularly, for images with many layers a huge improvement in speed can be expected. Furthermore, the invention requires only memory storage and lookup, integer additions, and integer comparisons. Thus, a very efficient embodiment is possible, particularly, in specialized hardware, like field-programmable gate arrays (FPGA). Moreover, the neural connections can be computed in parallel, which would be very suitable for an implementation on a graphics chip (GPU).

What is claimed is:

1. A system for pattern matching, the system comprising:
   one or more processors and a memory, the memory having instructions encoded thereon such that upon execution of the instructions, the one or more processors perform operations of:
   converting a test array into neural inputs;
   receiving the neural inputs into a template neural network to generate output neurons; and
   evaluating the output neurons to identify a location of a template in the test array.

2. The system as set forth in claim 1, wherein the operations further comprise:
   generating a library of templates, where each template is a three-dimensional array, with each pixel in the array representing a value at a particular x, y, and z coordinate along x, y, and z axes, such that the library of templates is composed of a plurality of three-dimensional templates;
   converting each column of pixels along one axis into a neural input; and
   establishing a delayed connection between each neural input and output neurons to generate the template neural network.

3. The system as set forth in claim 2, wherein establishing a delayed connection further comprises operations of:
   converting each pixel of each three-dimensional array through all layers into a neural index;
   converting an x-axis into a time axis such that pixels with different x-coordinates represent different events in time;
   identifying an x-location of a pixel or set of pixels in the template with the largest x-value, wherein the x-location with the largest x-value is a reference point that corresponds to a latest time point when pixels of the template are entered into the template neural network; and
   setting a connection delay between each input neuron and output neuron based on a time gap between the x-location of each input neuron and the reference point.

4. The system as set forth in claim 3, wherein evaluating the output neurons further comprises operations of:
   comparing values of the output neurons against a threshold, such that if an output neuron reaches its threshold, the output neuron fires, indicating a match between the template and test array;
   obtaining an x-axis location as a time-step in which the output neuron fired; and
   obtaining a y-axis location from an index of the output neuron.

5. The system as set forth in claim 4, wherein in receiving the neural inputs into a template neural network to generate output neurons, the neural input is fed forward to the output neurons through delayed connections.

6. The system as set forth in claim 1, wherein evaluating the output neurons further comprises operations of:
   comparing values of the output neurons against a threshold, such that if an output neuron reaches its threshold, the output neuron fires, indicating a match between the template and test array;
   obtaining an x-axis location as a time-step in which the output neuron fired; and
   obtaining a y-axis location from an index of the output neuron.

7. The system as set forth in claim 1, wherein in receiving the neural inputs into a template neural network to generate output neurons, the neural input is fed forward to the output neurons through delayed connections.

8. The system as set forth in claim 1, wherein the test array is a test image.

9. A computer implemented method for pattern matching using one or more processors, the method comprising acts of:
converting, with the one or more processors, a test array into neural inputs;
receiving the neural inputs into a template neural network to generate output neurons; and
evaluating, with the one or more processors, the output neurons to identify a location of a template in the test array.

10. The method as set forth in claim 9, further comprising acts of:
generating a library of templates, where each template is a three-dimensional array, with each pixel in the array representing a value at a particular x, y, and z coordinate along x, y, and z axes, such that the library of templates is composed of a plurality of three-dimensional templates;
converting each column of pixels along one axis into a neural input; and
establishing a delayed connection between each neural input and output neurons to generate the template neural network.

11. The method as set forth in claim 10, wherein establishing a delayed connection further comprises acts of:
converting each pixel of each three-dimensional array through all layers into a neural index;
converting an x-axis into a time axis such that pixels with different x-coordinates represent different events in time;
identifying an x-location of a pixel or set of pixels in the template with the largest x-value, wherein the x-location with the largest x-value is a reference point that corresponds to a latest time point when pixels of the template are entered into the template neural network; and
setting a connection delay between each input neuron and output neuron based on a time gap between the x-location of each input neuron and the reference point.

12. The method as set forth in claim 11, wherein evaluating the output neurons further comprises acts of:
comparing values of the output neurons against a threshold, such that if an output neuron reaches its threshold, the output neuron fires, indicating a match between the template and test array;
obtaining an x-axis location as a time-step in which the output neuron fired; and
obtaining a y-axis location from an index of the output neuron.

13. The method as set forth in claim 12, wherein in receiving the neural inputs into a template neural network to generate output neurons, the neural input is fed forward to the output neurons through delayed connections.

14. The method as set forth in claim 9, wherein evaluating the output neurons further comprises acts of:
comparing values of the output neurons against a threshold, such that if an output neuron reaches its threshold, the output neuron fires, indicating a match between the template and test array;
obtaining an x-axis location as a time-step in which the output neuron fired; and
obtaining a y-axis location from an index of the output neuron.

15. The method as set forth in claim 9, wherein in receiving the neural inputs into a template neural network to generate output neurons, the neural input is fed forward to the output neurons through delayed connections.

16. The method as set forth in claim 9, wherein the test array is a test image.

17. A computer program product for pattern matching, the computer program product comprising computer-readable instructions stored on a non-transitory computer-readable medium that are executable by a computer having a processor for causing the processor to perform operations of:
converting a test array into neural inputs;
receiving the neural inputs into a template neural network to generate output neurons; and
evaluating the output neurons to identify a location of a template in the test array.

18. The computer program product as set forth in claim 17, further comprising instructions for causing the processor to perform operations of:
generating a library of templates, where each template is a three-dimensional array, with each pixel in the array representing a value at a particular x, y, and z coordinate along x, y, and z axes, such that the library of templates is composed of a plurality of three-dimensional templates;
converting each column of pixels along one axis into a neural input; and
establishing a delayed connection between each neural input and output neurons to generate the template neural network.

19. The computer program product as set forth in claim 18, wherein establishing a delayed connection further comprises operations of:
converting each pixel of each three-dimensional array through all layers into a neural index;
converting an x-axis into a time axis such that pixels with different x-coordinates represent different events in time;
identifying an x-location of a pixel or set of pixels in the template with the largest x-value, wherein the x-location with the largest x-value is a reference point that corresponds to a latest time point when pixels of the template are entered into the template neural network; and
setting a connection delay between each input neuron and output neuron based on a time gap between the x-location of each input neuron and the reference point.

20. The computer program product as set forth in claim 19, wherein evaluating the output neurons further comprises operations of:
comparing values of the output neurons against a threshold, such that if an output neuron reaches its threshold, the output neuron fires, indicating a match between the template and test array;
obtaining an x-axis location as a time-step in which the output neuron fired; and
obtaining a y-axis location from an index of the output neuron.

21. The computer program product as set forth in claim 20, wherein in receiving the neural inputs into a template neural network to generate output neurons, the neural input is fed forward to the output neurons through delayed connections.

22. The computer program product as set forth in claim 17, wherein evaluating the output neurons further comprises operations of:

comparing values of the output neurons against a threshold, such that if an output neuron reaches its threshold, the output neuron fires, indicating a match between the template and test array;

obtaining an x-axis location as a time-step in which the output neuron fired; and obtaining a y-axis location from an index of the output neuron.

23. The computer program product as set firth in claim 17, wherein in receiving the neural inputs into a template neural network to generate output neurons, the neural input is fed forward to the output neurons through delayed connections.

24. The computer program product as set forth in claim 17, wherein the test array is a test image.

\* \* \* \* \*